United States Patent
Menkhoff

(10) Patent No.: US 8,717,116 B2
(45) Date of Patent: May 6, 2014

(54) METHOD AND APPARATUS FOR MODIFYING A CHARACTERISTIC OF A COMPLEX-VALUED SIGNAL

(75) Inventor: Andreas Menkhoff, Oberhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1067 days.

(21) Appl. No.: 12/649,102

(22) Filed: Dec. 29, 2009

(65) Prior Publication Data

US 2011/0156832 A1 Jun. 30, 2011

(51) Int. Cl.
*H04L 27/20* (2006.01)
(52) U.S. Cl.
USPC ............ 332/103; 332/107; 375/308; 375/340
(58) Field of Classification Search
USPC ................... 332/106, 107, 103; 375/308, 340
See application file for complete search history.

(56) References Cited

U.S. PATENT DOCUMENTS

| 7,054,385 B2 | 5/2006 | Booth et al. |
| 8,331,490 B2 * | 12/2012 | Wang et al. .................. 375/308 |
| 2006/0227895 A1 | 10/2006 | Booth et al. |
| 2007/0211829 A1 | 9/2007 | Liang et al. |

* cited by examiner

*Primary Examiner* — Arnold Kinkead
(74) *Attorney, Agent, or Firm* — Eschweiler & Associates, LLC

(57) ABSTRACT

A method for modifying a characteristic of a representation of a complex-valued signal which comprises at least a representation of a first and a second complex-valued symbol comprising deriving a relative phase angle between the representation of the first and the second complex-valued symbols. The method further comprises combining a representation of a complex-valued enhancement pulse and the representation of the complex-valued signal to obtain a representation of a first and a second corrected complex-valued symbol, wherein the enhancement pulse is chosen such that the relative phase angle between the first and second corrected symbols is smaller than a predetermined threshold.

9 Claims, 13 Drawing Sheets

METHOD AND APPARATUS FOR MODIFYING A CHARACTERISTIC OF A COMPLEX-VALUED SIGNAL

BACKGROUND

Digital information is often transmitted via an air interface by modulating a high frequency carrier signal. The digital information is created and processed at a symbol rate, the symbol rate being determined by the time that is reserved to transmit a single symbol over the air interface. When different symbols are transmitted, a rather smooth transition between the subsequent symbols is created in order to avoid influencing neighboring channels and to not spoil the quality of the transmitted signal. When the transmitted digital information is represented by symbols within the complex plane, trajectories in the complex plane are created in between the consecutive symbols. The trajectories can thus be understood to be a representation of a complex valued signal generated by the transition between two subsequent symbols. The phase and the magnitude along the trajectories are modulated on the high frequency carrier in order to provide a smoothly varying modulated high frequency carrier. Depending on the modulator used, the modulation may be performed based on the magnitude parameter R and the phase parameter $\phi$ or on the real part (in phase component I) and the imaginary part (quadrature component Q) of the representation of the complex-valued signal defined by the trajectory in the imaginary plane.

It may be desirable to modify the characteristic of a complex-valued signal before modulating the high frequency carrier in order to avoid introducing distortions into the modulated signal.

SUMMARY OF THE INVENTION

According to an embodiment of the present invention, a characteristic of a representation of a complex-valued signal, which comprises at least a representation of a first and a second complex-valued symbol, is modified such that a relative phase angle between two corrected symbols is maintained smaller than a predetermined threshold. To this end, a relative phase angle between the first and second complex-valued symbols of the representation of the complex-valued signal may be derived. A representation of a complex-valued enhancement pulse is combined with the representation of the complex-valued signal to provide a representation of a first and a second corrected symbol, wherein the enhancement pulse is chosen such that the relative phase angle between the first and second corrected symbols is smaller than the predetermined threshold. By using an appropriate complex-valued enhancement pulse for the combination, corrected symbols may thus be derived, which have a relative phase angle that does not exceed the predetermined threshold.

BRIEF DESCRIPTION OF THE DRAWINGS

Several embodiments of the present invention are subsequently described by the following figures in which like reference numerals designate corresponding or similar parts, wherein.

DETAILED DESCRIPTION OF ILLUSTRATIVE EMBODIMENTS

Figure 1:
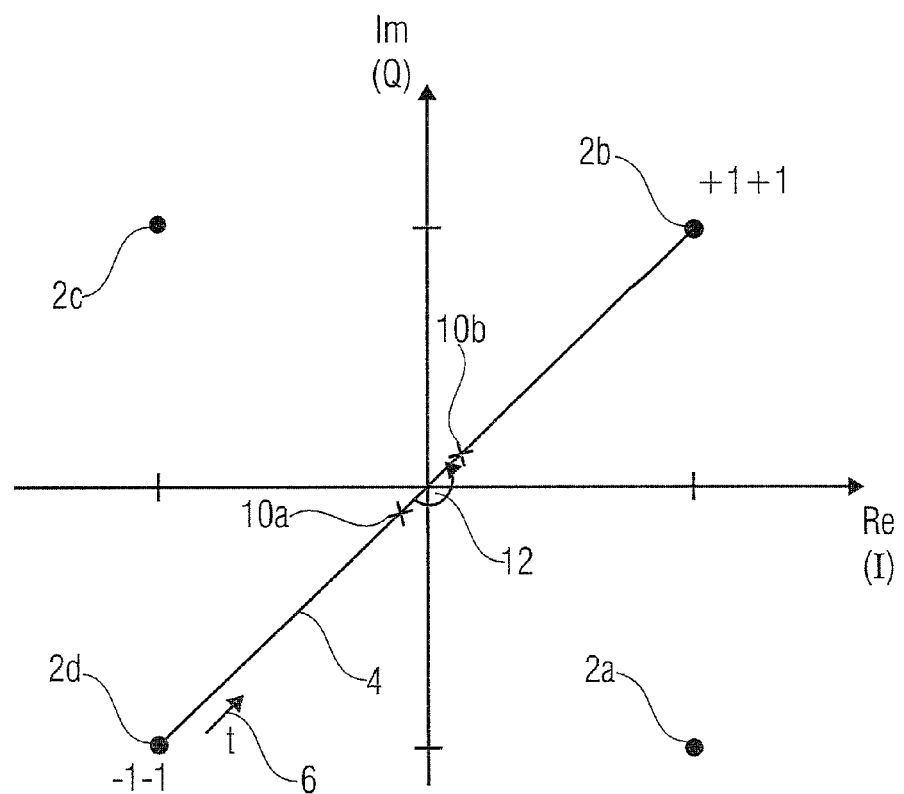
FIG. 1 shows an example of a representation of a complex-valued signal.

FIG. 1 shows an example of a representation of a complex-valued signal, which may be processed by some embodiments of the present invention.

The real part (in-phase component) is shown on the X-axis and the imaginary part (quadrature component Q) is shown on the Y-axis. FIG. 1 shows the commonly known constitution diagram of 4PSK modulation. One bit may be transmitted by the in-phase component I and one bit by the quadrature component. Thus, four individual symbols 2a to 2d can be defined wherein one symbol is transmitted at a time, that is within a predetermined time window reserved for the transmission of the information corresponding to one symbol. In a practical implementation, a high frequency carrier is modulated differently for each symbol and digital data is transmitted by subsequently transmitting multiple symbols over the modulated carrier. However, there is no instantaneous switchover between the modulation states corresponding to the individual symbols when transiting between neighboring symbols (at a frequency defined by the symbol rate). This may be avoided in order to not introduce high frequencies into the spectrum, which potentially disturbs neighboring transmission channels.

In order to avoid such a disturbance, a smooth transition is performed between neighboring symbols. In practical implementations, this may be achieved by pulse shaping the logical signals corresponding to each symbol.

This fade-over of the high frequency signal is illustrated in the constellation diagram of FIG. 1 by a trajectory connecting symbol 2d to symbol 2b. That is, when first transmitting symbol 2d and subsequently transmitting symbol 2b, the trajectory 4 evolves with time from symbol 2d to symbol 2b as indicated by the time direction 6. In more general terms, the trajectory 4 is a representation of a complex-valued signal, which is created by the transition between subsequently sent symbols in the constellation diagram. The representation of the complex-valued signal 4 defined by the transition of the symbol 2d to the symbol 2a is thus modulated on the high frequency carrier when first sending the information corresponding to symbol 2d and then sending the information corresponding to symbol 2b.

As it will be elaborated on in more detail below, the modulation may be performed by different technical implementations. For example, I/Q modulators may be used, receiving a signal corresponding to the real part (I) of the trajectory 4 and a further signal corresponding to the imaginary part (Q) of the trajectory 4 as an input. In alternate embodiments, the magnitude R along the trajectory and the phase angle φ along the trajectory may be input into a so-called R/φ modulator in order to synthesize the modulated high frequency signal. Separate time dependant functions (signals) for I and Q or for R and φ are just different representations of the complex-valued signal of FIG. 1.

Figure 2:
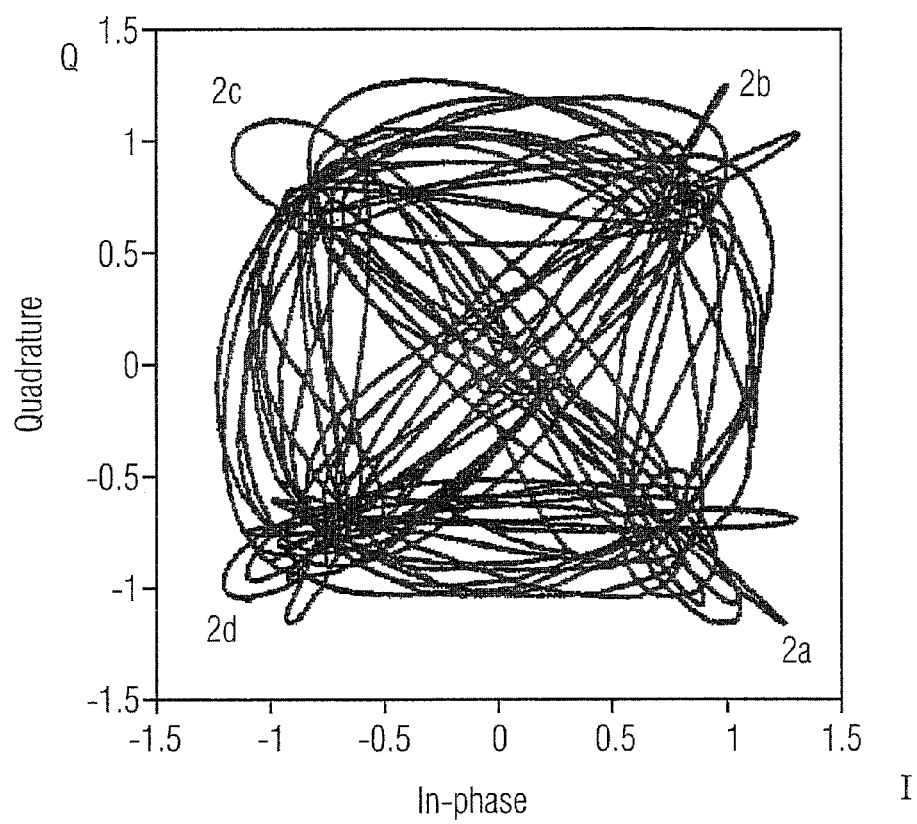
FIG. 2 shows an example of a constitution diagram for a 4PSK modulation.

In the simplified illustration in FIG. 1, the trajectory 4 is created using the shortest path between the symbols 2d and 2b. As shown in FIG. 2, the trajectories of real implementations may deviate from the idealized trajectory 4 of FIG. 1 due to the effects of the previously discussed signal (pulse) shaping. In some practical implementations, the trajectory 4 can be sampled with a sampling frequency much higher than the symbol rate (symbol frequency) in order to synthesize the high frequency signal based on the so-generated super-sampled symbols. FIG. 1 shows a first complex-valued symbol 10a and a second complex-valued symbol 10b as they could be derived from sampling the trajectory 4. The trajectory 4 crosses the origin of the complex plane between the two symbols 10a and 10b. Whereas the imaginary part and the real part changes moderately between the first and second complex-valued symbols 10a and 10b, the phase 12 between those two neighboring symbols 10a and 10b changes by 180° and thus by the maximum possible amount. It may be noted that the term symbol is previously used for the symbols generated at symbol rate (the symbols corresponding to a particular logical information). The points within the constellation diagram that are generated by supersampling the trajectory were named super-sampled symbols. However, this distinction is not necessary for the subsequent description of several embodiments. Therefore, all points within the constellation diagram will be called complex-valued symbols, including both of the previously described cases.

A great change of the phase angle may be disadvantageous for particular types of high frequency modulators. For example, an R/φ modulator synthesizes the modulated carrier signal by directly modulating the phase of a carrier oscillator and by appropriately amplifying the so-generated signal. These modulators can be implemented with high efficiency. For example, the carrier oscillator may oscillate at a frequency of in between 0.7 GHz to 10 GHz. The oscillation frequency may be altered by switchable capacities within the oscillation circuit to vary the oscillation frequency at step sizes between +/−0.1 MHz to +/−100 MHz. The smaller the individual step size of the oscillator is chosen, the less the noise the DCO (Digitally Controlled Oscillator) introduces into the signal. However, the greater the step size, the greater the bandwidth of a signal generated by the DCO (digital control oscillator) may be. In practical implementations, a compromise between the two parameters has to be made. According to several embodiments of the present invention, one may additionally modify the characteristic of the complex-valued signal 4 such that phase changes during a sampling time of the DCO is limited to a maximum value, which in turn allows to use low noise DCOs with smaller step sizes. This may be achieved according to some embodiments of inventive methods for modifying the characteristic of a representation of a complex-valued signal.

FIG. 2 illustrates a constellation diagram for a 4PSK modulation as it is retrieved from a practical implementation. The constellation diagram of FIG. 2 shows numerous transitions between the four possible symbols 2a to 2d of a 4PSK modulation. As already discussed previously, the transitions are not ideal in the sense of a straight line, but deviate from a straight line due to the pulse shaping of the signals. Nonetheless, the diagonal trajectories between the symbols 2d and 2b or 2c and 2a may come close to the origin such that the representation of the complex-valued signal defined by those trajectories may exhibit large phase fluctuations in between two complex-valued symbols (as generated by super-sampling the trajectories).

Figure 3:
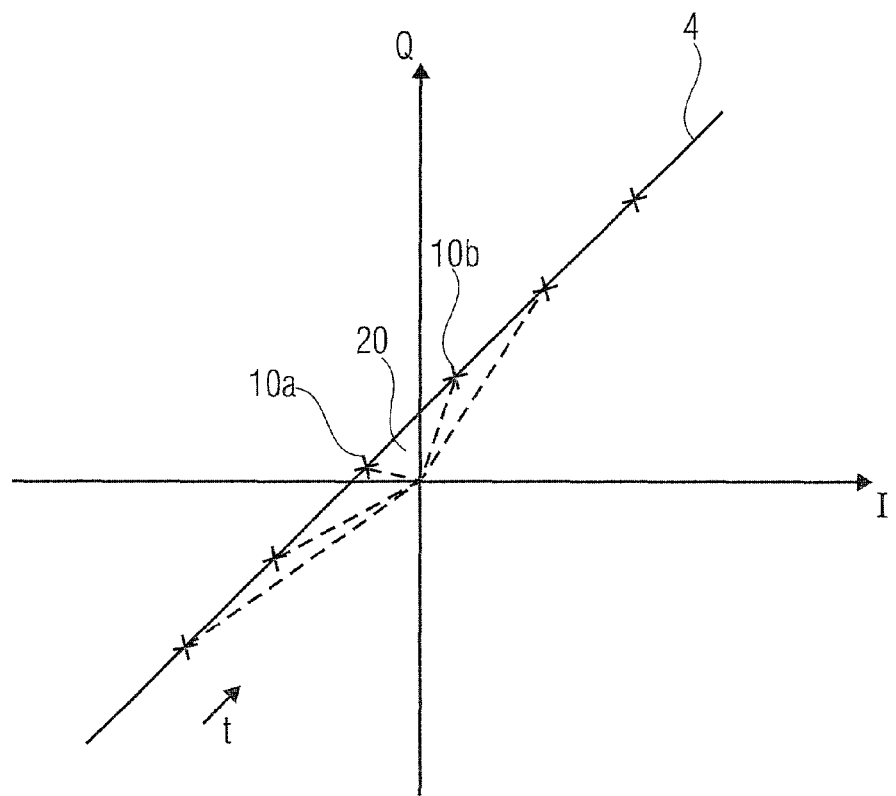
FIG. 3 shows an exemplary trajectory of the constitution diagram of FIG. 2.

FIG. 3 shows a magnification of a trajectory 4 coming close to the origin of the constellation diagram. In more general terms, FIG. 3 shows a representation of a complex-valued signal 4. Numerous complex valued symbols (samples) are illustrated along the representation of the complex-valued signal 4. The relative phase angle 20 between a first complex-valued symbol 10a and a second complex-valued symbol 10b is the maximum relative phase angle occurring between any neighboring pairs of symbols. That is, the phase might change to an inappropriate or undesirable extent between the symbols 10a and 10b. If the relative phase angle 20 is higher than a predetermined threshold, a complex-valued enhancement pulse may be combined with the complex-valued signal 4 according to some embodiments of the present invention. Thus, corrected symbols are provided, which replace the first and second symbols 10a and 10b and which exhibit a relative phase angle below the predetermined threshold. Several embodiments of methods to modify the characteristic of the representation of the complex-valued signals are subsequently discussed referencing FIGS. 4 to 7a.

In summarizing FIG. 3, sampling a continuous complex-valued signal may provide a sequence of consecutive complex-valued symbols. A relative phase angle between neighboring sampled symbols is a measure for the variation speed of the phase of the complex-valued signal 4. This, in turn, is a measure for the instantaneous frequency of the complex-valued signal, which is generally defined as the time derivative of the variation of the phase, d/dt φ(t).

A measure for the instantaneous frequency of the complex-valued signal of FIG. 3 may, therefore, be derived by dividing the relative phase angle between the first and second complex-valued symbols 10a and 10b by the sampling time T between the two complex-valued symbols 10a and 10b.

Figure 4:
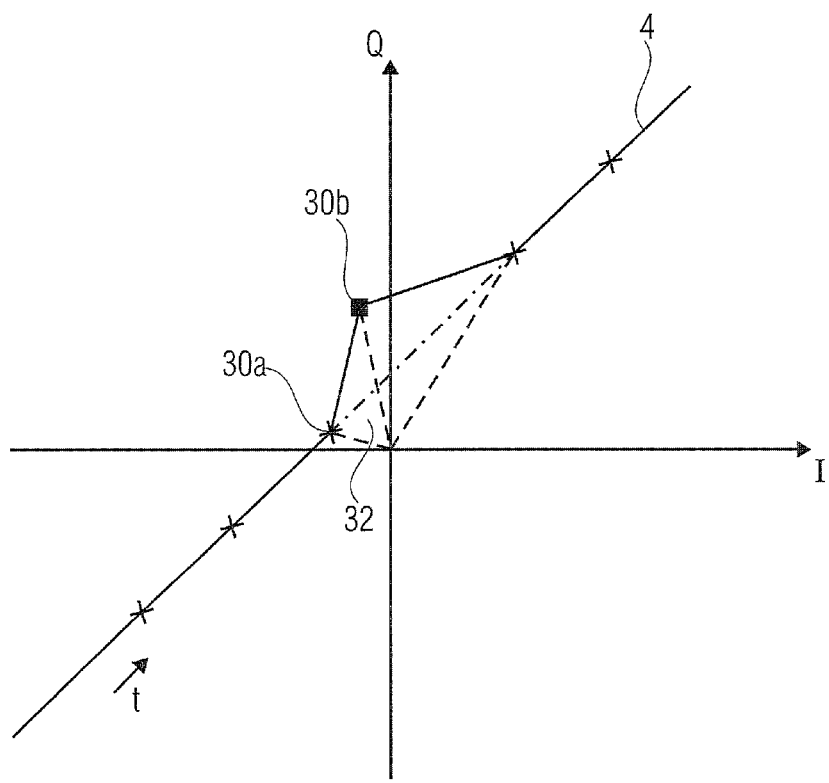
FIG. 4 shows an embodiment of a method for modifying the characteristic of the representation of the complex-valued signal of FIG. 3.

FIGS. 3 and 4 together illustrate an embodiment of a method for modifying the characteristic of a representation of a complex-valued signal 4, the complex-valued signal 4 comprising at least a first and a second complex-valued symbol 10a and 10b. In order to modify the characteristic of the signal appropriately, a relative phase angle 20 between the first complex-valued symbol 10a and the neighboring second complex-valued symbol 10b is derived. When the relative phase angle 20 exceeds a predetermined threshold, a complex-valued enhancement pulse is combined with the complex-valued signal 4 in order to provide a representation of a first corrected symbol 30a and a second corrected symbol 30b, wherein the enhancement pulse is chosen such that the relative phase angle 32 between the representation of the first and second corrected symbols 30a and 30b is smaller than the predetermined threshold.

According to the embodiment illustrated in FIG. 4, the relative phase angle between the first and second corrected symbols 30a and 30b is modified such that it is smaller than a predetermined threshold. As compared to the trajectory or the complex-valued signal 4 of FIG. 3, the phase angle was decreased from approximately 90 degrees to approximately 50 degrees.

This is achieved by adding a complex-valued enhancement pulse to the representation of the complex-valued signal of FIG. 3. In particular, the second symbol 10b is transferred to the corrected second symbol 30b. This may, for example, be achieved by adding a complex-valued enhancement symbol to the second symbol 10b. This, however, is only one possibility of combining a representation of a complex-valued enhancement pulse with the representation of the complex-valued signal.

According to a further embodiment, a complex-valued enhancement pulse (not only discrete single symbols) may be added to the representation of the complex-valued signal 4 of FIG. 3, such that subsequent super-sampling will provide the symbols 30a and 30b. In the embodiment of FIG. 4, such an enhancement pulse could be derived from the difference of the original complex-valued signal (illustrated in dashed-dotted lines) and a resultant complex-valued signal 4 illustrated in solid lines in FIG. 4. However, this idealized curve or complex valued enhancement pulse is just one of an arbitrary number of possible examples to choose complex-valued enhancement pulses to be combined with the representation of the complex-valued signal.

Figure 5:
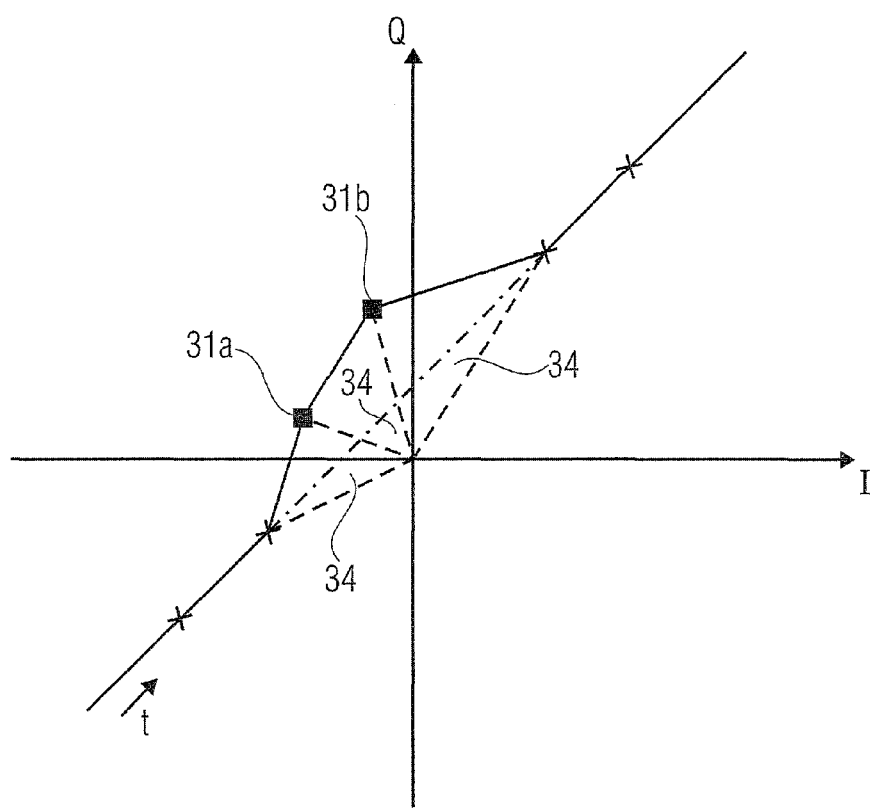
FIG. 5 shows a further embodiment of a method for modifying the characteristic of the complex-valued signal of FIG. 3.

For example, the result of the combination of an alternative enhancement pulse with the complex-valued signal is illustrated in FIG. 5. In the embodiment of FIG. 5, the first corrected symbol 30a as well as the second corrected symbol 30b is "shifted" with respect to the original complex-valued signal 4 of FIG. 3. This may, for example, be achieved by adding a complex-valued enhancement symbol to each of the symbols 10a and 10b. Alternatively, one complex-valued enhancement pulse may be applied, which is long enough such as to influence the complex-valued signal for two super-sampling intervals. In the particular example in FIG. 5, this results in relative phase angles 34 in between subsequent symbols of approximately 45° and, hence, in smaller angles than the angles achieved with the correction of FIG. 4.

Depending on the specific requirement of an implementation, the enhancement pulse may be chosen such that the relative phase angles between the symbols influenced by the enhancement pulse are as small as possible. According to further embodiments, the enhancement pulse is chosen such that the pulse is as small as possible while still achieving the goal of bringing the relative phase angle between the corrected symbols below the threshold. These embodiments may have the advantage that the energy added to the signal is minimal such that the detection of the transmitted symbols on the receiver's side is not hindered. This might be the case when too much energy is introduced into the signal, that is when the magnitude of the symbols is modified too much. This may be of particular interest when the symbols to be transmitted (the end point of each trajectory) comprise the symbol [0, 0] at the origin of the constellation diagram (which is, for example, possible in UMTS signals). When, however, applying enhancement pulses of minimum magnitude, subsequent zeros in the constellation diagram can still be detected on a receiver side, even when subsequent trajectories had been modified.

This is, for example, not possible, when just demanding a fixed minimum distance of each trajectory to the origin, which could, for example, be achieved by defining a minimum radius around the origin and by shifting all trajectories out of the circular area defined by the radius. This, however, leads to an EVM (error vector magnitude) which is too big to allow for an error-free detection of the altered signals. Furthermore, a further constraint to mobile telecommunication systems, the spectral damping could not be met when defining a minimum radius, as adding pulses large enough to fulfill the radius requirement would result in high-frequency components in the modified signal, which might no longer fit under the specified frequency mask. Thus, neighboring channels may be distorted. However, when combining a complex-valued signal and a complex-valued enhancement pulse, which is chosen such that the relative phase angle between the corrected symbol is smaller than a predetermined threshold, the previously discussed drawbacks may be avoided.

Figure 6A:
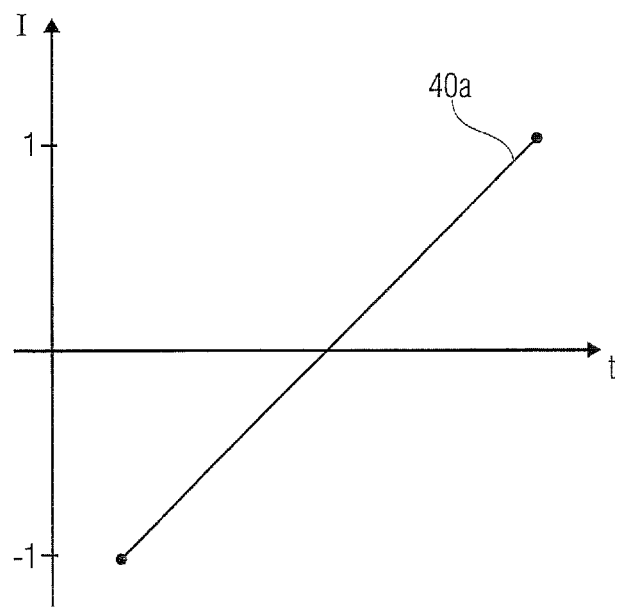
FIG. 6, consisting of FIGS. 6a and 6b, shows an alternative representation of the complex-valued signal of FIG. 3.
Figure 6B:
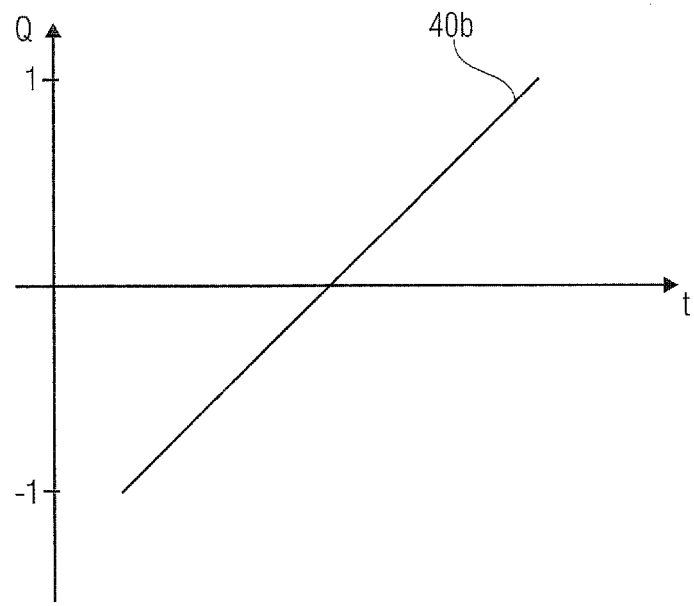
Figure 7A:
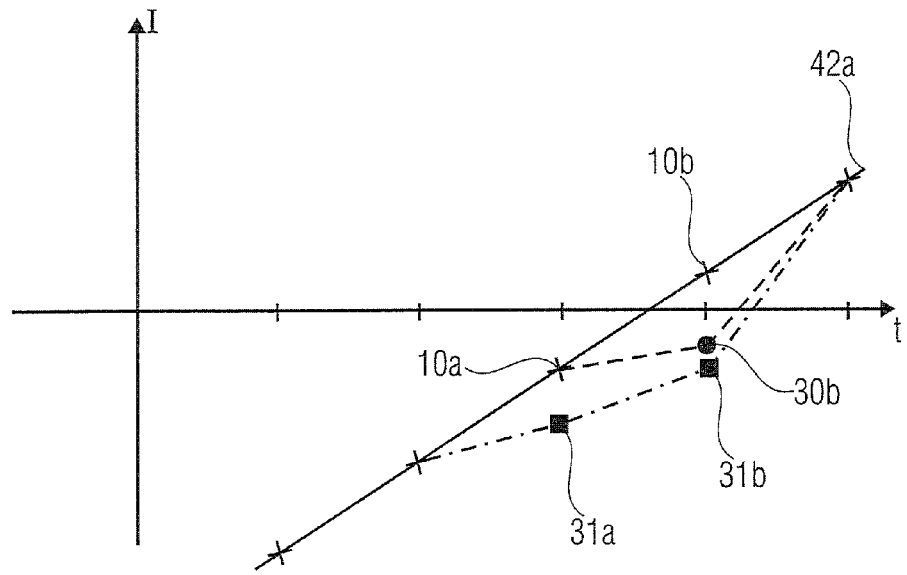
FIG. 7, consisting of FIGS. 7a and 7b, shows a further embodiment of a method for modifying the characteristic of the complex-valued signal of FIG. 6.
FIG. 7c shows a further embodiment of a method for modifying the characteristic of a complex-valued signal.
Figure 7B:
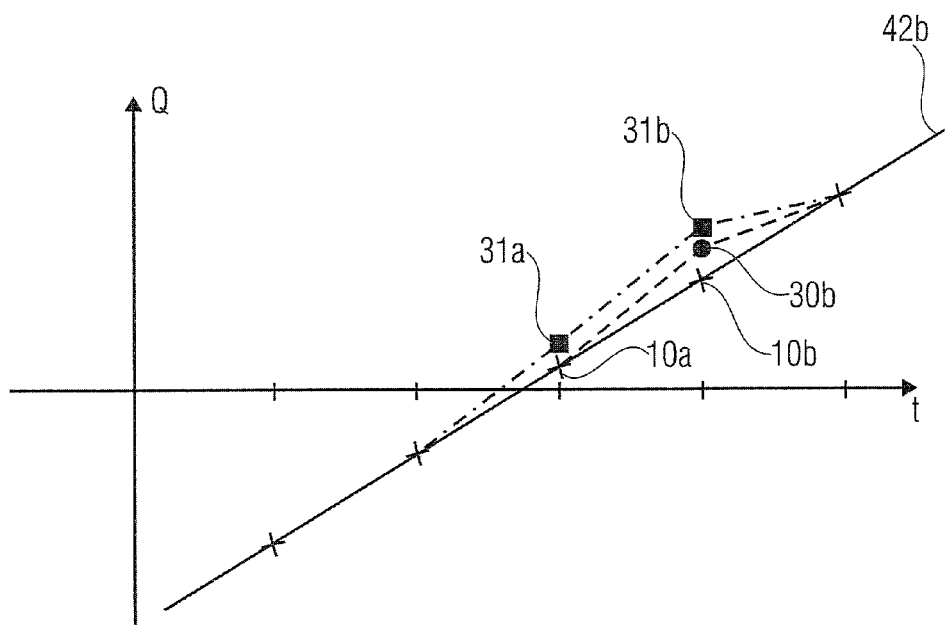
Figure 7C:
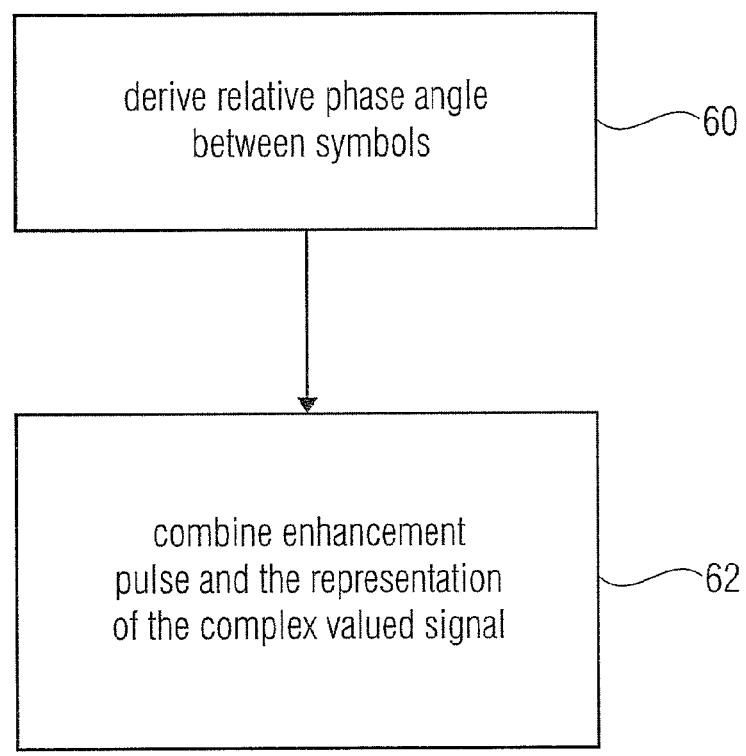

FIGS. 6 and 7 illustrate a further possibility to combine a representation of a complex-valued enhancement pulse with the representation of the complex-valued signal. The representation of the complex-valued enhancement pulse is not necessarily given as a function of complex values depending on time, since the representation of a complex-valued signal may also be provided by two real valued time dependant functions, as for example illustrated in FIG. 6.

FIG. 6 illustrates a representation of a complex-valued signal, according to which the imaginary part (the quadrature Q) and the real part (the in-phase part I) are given as real-valued functions depending on time. FIG. 6 shows an alternative representation of the idealized trajectory of FIG. 1, where the real part (in-phase component) is given as a first real-valued function 40a and wherein the imaginary part (quadrature component Q) is given as a second real-valued function 40b.

FIG. 7 shows the representation of the complex-valued signal of FIG. 3 in the notation introduced in FIG. 6. The in-phase component is given by function 42a and the quadrature component is given by function 42b. According to this embodiment, the representation of the complex-valued enhancement signal thus has two components, a real-valued component for the in-phase part 42a and a real-valued component for the quadrature part 42b. The in-phase and the quadrature components may also be implemented as continuous analog signals. Each of the two parts of the representation may be sampled separately in order to arrive at the representations of the first complex-valued symbol 10a and the second complex-valued symbol 10b. Accordingly, also the representation of the complex-valued symbols 10a and 10b may comprise two different parts, an in-phase part and a quadrature part of the representation of the complex-valued symbol. In other words, the representation may either be a continuous representation or a representation consisting of a series of discrete values.

As illustrated in FIG. 7, combining the representation of a complex-valued enhancement pulse with the representation of the complex-valued signal thus comprises adding a first real-valued enhancement pulse to a real part of the complex-valued signal or adding a second real-valued enhancement pulse to an imaginary part of the complex-valued signal. Although real-valued enhancement pulses are added to the in-phase component as well as to the quadrature component in FIG. 7, alternative embodiments may be implemented such that enhancement pulses are only added to one of the two components. Also in embodiments that have the principal capability to add correction pulse to both components, constellations may occur, in which the representation of the complex-valued enhancement pulse is chosen such that an enhancement pulse is only added to one of the components.

Adding the real-valued enhancement pulses may be performed by adding discrete quantities to the in-phase and to the quadrature parts of the representation of the complex-valued symbols 10a and 10b. Alternatively, when the in-phase and quadrature components are implemented as continuous functions in an analog or digital domain, continuous enhancement pulses may be added to the in-phase and quadrature components of the representation of the complex-valued signal. Subsequent sampling may then provide the representations of the first and second corrected symbols 31a and 31b or 30a and 30b.

According to further embodiments, yet another representation of a complex-valued signal may be used. According to those embodiments, the magnitude and phase components of the complex-values signal may be represented by separate real-valued functions. Thus, the combination of the enhancement pulse may also be performed by adding or multiplying a real valued enhancement pulse to one or to both parts of the representation of a complex-valued signal.

In other embodiments, the representation of the complex-valued symbols, i.e., the sampling points of the magnitude and the phase component may be modified in a time discrete manner. That is, combining the enhancement pulse may be performed by adding real-valued numbers to one or to both of the sampling values of the magnitude and the phase component.

FIG. 7c again illustrates an embodiment of a method for modifying the characteristic of a representation of a complex-valued signal which comprises at least a first and a second complex-valued symbol as indicated previously. The method comprises a deriving step 60, in which a relative phase angle between the first and second complex-valued symbols of the representation of a complex-valued signal is derived.

In an enhancement step 62, a representation of a complex-valued enhancement pulse is combined with the representation of a complex-valued signal to provide a representation of a first and of a second corrected symbol, wherein the enhancement pulse is chosen such that the relative phase angle between the representation of the first and second corrected symbols is smaller than a predetermined threshold.

A further optional comparing step may be performed, in order to decide whether the combination with a complex-valued enhancement pulse is required or not.

According to the previously discussed embodiments of the present invention, the distortion introduced into the signal by the enhancement pulse may be minimized since the complex-valued enhancement pulse may be chosen such that the magnitude of the enhancement pulse is greater for symbols with a higher magnitude than for symbols with a lower magnitude.

As also illustrated previously, the representation of a complex-valued signal may comprise a sequence of numerous complex-valued signals. According to several embodiments, these may be sampling points or sampled symbols along a trajectory of a constellation diagram. Some embodiments of the present invention may be applied in the field of telecommunication in order to process a representation of a base-band signal that is the signal composed of the different symbols to be transmitted.

When the representation comprises a sequence of complex-valued signals, a relative phase angle may be derived for each pair of neighboring symbols within the sequence (wherein neighboring means a sampling value and its direct predecessor or follower in time).

The complex-valued enhancement signal may then be applied for every pair of neighboring signals having a relative phase angle that exceeds the predetermined threshold. In those embodiments, the length of each enhancement pulse may depend on the frequency of the application of an enhancement pulse. The length of an enhancement pulse may in general terms be defined to be a measure for the number of neighboring symbols, which are influenced by a single enhancement pulse. In particular, the length of the enhancement pulse may depend on the number of symbols occurring between two pairs of symbols that cause the application of an enhancement pulse. The pulse may be shorter for a smaller number of symbols between two subsequent applications of an enhancement pulse in order to avoid introducing too much energy by the enhancement pulses. According to several embodiments, a longer enhancement pulse may be used as a standard pulse. The longer enhancement pulse may then be provided with a relatively low bandwidth, such as to not introduce high-frequency components into the signal modified by the enhancement pulse. Thus, also a modified signal may fulfill the spectral requirements of, for example, mobile telecommunication applications.

Figure 8:
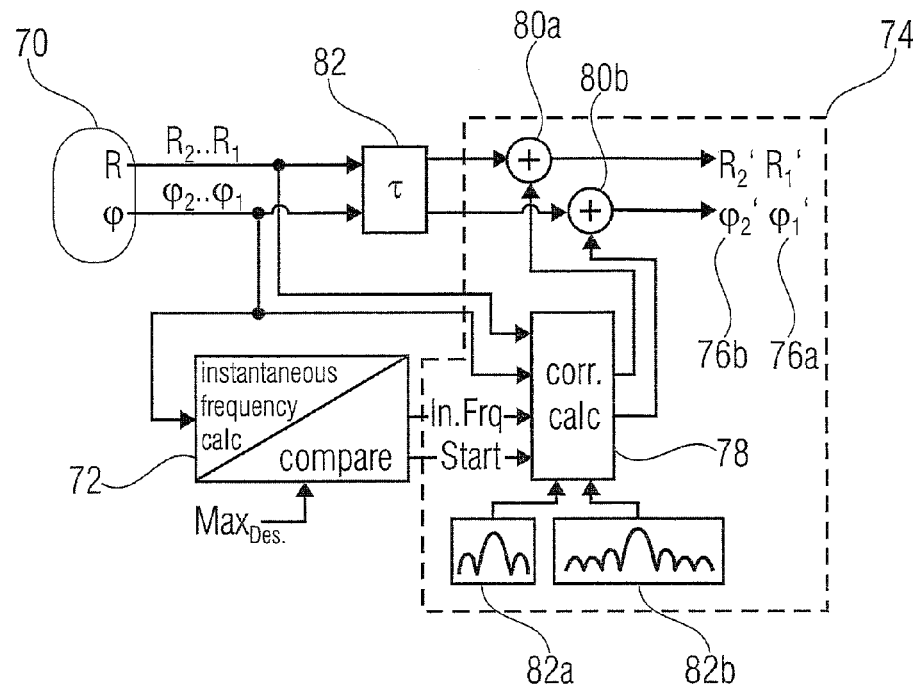
FIG. 8 shows an embodiment of an apparatus for modifying the characteristic of a representation of a complex-valued signal.

FIG. 8 shows an embodiment of an apparatus for modifying the characteristic of a representation of a complex-valued signal, which comprises at least a first and a second complex-valued symbol. As indicated in FIG. 8, the representation of a complex-valued signal 50 is a representation where the magnitude R and the phase $\phi$ are represented by two independent real-valued functions. The phase component of the representation of the complex-valued signal 50 is input into an analyzer, which is adapted to derive the relative phase angle between a representation of a first complex-valued symbol $(R_1, \phi_1)$ and of a second complex-valued symbol $(R_2, \phi_2)$ of the representation of the complex-valued signals 70.

The analyzer 72 steers a signal enhancer 74, which is adapted to combine a representation of a complex-valued enhancement pulse with the representation of the complex-valued signal 70 to provide a representation of a first and a second corrected symbol 76a and 76b $(R_{1'}, \phi_{1'},$ and $R_{2'}, \phi_{2'})$, wherein the enhancement pulse is chosen such that the relative phase angle between the representation of the first and second corrected symbols 76a and 76b is smaller than the predetermined threshold. To this end, the signal enhancer may be controlled by the analyzer in order to only apply the enhancement pulse when necessary. In the alternative embodiment illustrated in FIG. 8, the analyzer comprises a comparator in order to determine whether the relative phase angle exceeds a predetermined threshold. Alternative to the comparison of the phase angle with a threshold, an instantaneous frequency may be estimated and compared with a frequency threshold. To this end, the instantaneous frequency may be estimated by dividing the relative phase angle by the sampling time.

In the embodiment illustrated in FIG. 8, the signal enhancer 74 is controlled by the analyzer 72, which outputs a start signal when a correction is required together with the determined relative phase angle or instantaneous frequency. The signal enhancer comprises a correction calculator 78, which calculates the enhancement pulses that are to be applied to the R and $\phi$ components of the representation of the complex-valued signal. In order to be able to choose an appropriate representation of a complex-valued enhancement pulse (to choose different real-valued pulses for each of the signal component R and $\phi$), the correction calculator of the signal enhancer 74 additionally receives copies of the representation of the complex-valued signals.

The correction calculator 78 may choose from or individually derive different enhancement pulses, depending on the properties of the two complex-valued symbols having a relative phase angle exceeding the predetermined threshold. The signal enhancer 74 further comprises a first adder 80a and a second adder 80b, in order to combine the representation of a complex-valued enhancement pulse (its R and φ components) and the representation of the complex-valued signal (its R and φ components). Thus, the representations of a first and second corrected symbol 76a and 76b may be provided by the signal enhancer 74.

FIG. 8 furthermore shows an optional delay unit 82, which may, in some embodiments be implemented in order to buffer the representation of the complex-valued signal 70 for a time used by the calculations performed by the signal analyzer 72 and the signal enhancer 74.

FIG. 8 further illustrates two different pulse shapes of enhancement pulses 82a and 82b, from which the correction calculator 78 may choose. It goes without saying that these are mere examples and that the signal enhancer 74 (the correction calculator 78) may appropriately choose from an infinite amount of enhancement pulses. Different enhancement signals may also be generated in situ, for example, based on one single prototype pulse. Also, depending on the number of required enhancement pulses, the duration of the enhancement pulse may be varied as also indicated previously.

When the apparatus of FIG. 8 is applied in the context of high-frequency modulations, as, for example, in telecommunication scenarios, the representation of the corrected symbols 70a and 70b may furthermore be provided to a high-frequency modulator, as, for example, to an R/φ or in I/Q modulator.

Figure 9:
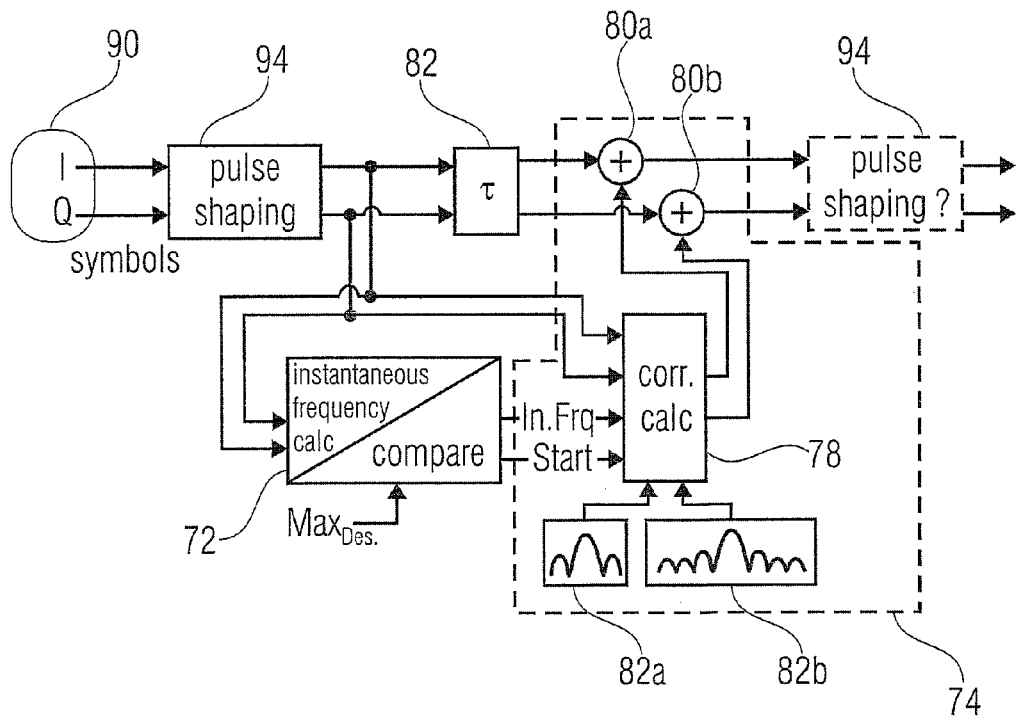
FIG. 9 shows a further embodiment of an apparatus for modifying the characteristic of a representation of a complex-valued signal.

FIG. 9 shows a further embodiment of an apparatus for modifying the characteristic of the representation of a complex-valued signal, which may be utilized to modify the same complex-valued signal as the apparatus of FIG. 8. However, the complex-valued signal may be provided in the I/Q representation 90, as illustrated in FIGS. 6 and 7. As the embodiment of FIG. 9 basically shares the same components with the embodiment of FIG. 8, only the differences will subsequently be described. For the same reason, like reference numerals designate like or identical components. The major difference to FIG. 8 is that the signal analyzer receives both components of the representation (I and Q) as an input, as both components are required in order to evaluate a relative phase angle between neighboring symbols of the representation of the complex-valued signal 90. The apparatus of FIG. 9 may additionally comprise pulse shapers 94 in order to modify the two components I and Q of the representation before modulating the high-frequency carrier in order to provide for the smooth transitions between the individual symbols. The pulse shaping may be implemented prior to the signal enhancer 74 or, in alternative embodiments, after the signal enhancer 74.

In some embodiments of the present invention, the apparatus in FIG. 9 is implemented within a telecommunication transceiver, such that the output of the apparatus of FIG. 9 may be used as an input to a high-frequency modulator, such as an R/φ or in I/Q modulator.

In summarizing, the limitation of the maximum angle of two subsequent symbols of a representation of a complex-valued signal leads to a limitation of the instantaneous frequency, when taking into account the present and the preceding input sample (complex-valued symbol). The strength (magnitude) of an enhancement pulse that may be added to the complex-valued signal may depend on the instantaneous frequency as well as on the amplitude of the input samples of the complex-valued signals. When the instantaneous frequency is high, a comparatively strong enhancement pulse may be added. When the instantaneous frequency is low, though still exceeding the predetermined threshold, a comparatively weak enhancement pulse may be added. The same is also true, mutatis mutandis, for the strength of the input signal. That is, when a high instantaneous frequency occurs between the inner symbols of a constellation diagram of a xxQAM signal, a comparatively low enhancement pulse may be sufficient. When a high instantaneous frequency occurs between outer symbols of an xxQAM signal, an enhancement pulse may be stronger.

According to some embodiments, the strength (magnitude) of the enhancement pulse is as small as possible in order to achieve the goal to shift the instantaneous frequency below the threshold. Inventive methods and apparatuses are applicable to I, Q representations as well as to R, φ representations. In the I, Q representations the individual enhancement pulses for the I and Q components may be roughly equal, whereas the enhancement pulses for polar coordinates R and φ may differ strongly. Due to the non-linear dependency of the polar coordinates from the Cartesian coordinates, it may be appropriate to individually compute the enhancement pulses, depending on the actual configuration. In polar coordinates, some embodiments may only apply an enhancement pulse to the phase component of the complex-valued representation.

According to some embodiments of the present invention, the maximum relative angle (the maximum instantaneous frequency) is configurable. The lower the maximum allowable value for the relative phase angle or the instantaneous frequency, the more corrections are required per time. That is, the smaller the predetermined threshold for the relative phase angle (the instantaneous frequency), the more enhancement pulses per time are required. Therefore, several embodiments of the present invention use enhancement pulses with varying lengths.

When, for a given representation of a complex-valued signal, the maximum acceptable instantaneous frequency or the maximum acceptable relative phase angle between two subsequent complex-valued symbols (super-sampled symbols) is decreased, more and more maxima of the instantaneous frequency (pairs of complex-valued symbols having a relative phase angle exceeding the threshold) are derived, which require the application of an enhancement pulse. That is, the lower the acceptable maximum instantaneous frequency, the more enhancement pulses per time are to be applied for a given representation of a complex-valued signal. Therefore, several embodiments of the present invention use enhancement pulses of varying length.

Figure 10:
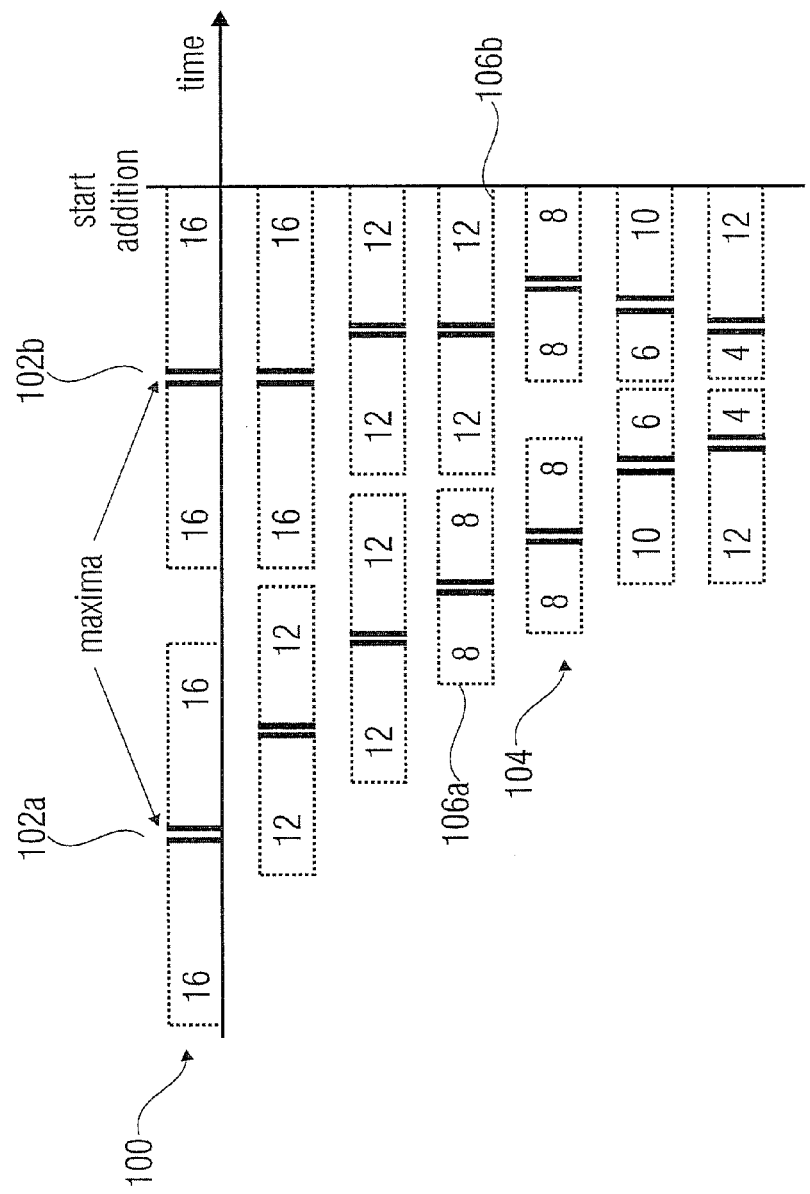
FIG. 10 shows an example for the determination of an enhancement signal.

FIG. 10 illustrates various possible configurations of enhancement pulses that may be applied to one of the adders 80a or 80b of the embodiments of FIG. 8 or 9. The time is given on the X-axis in units corresponding to the frequency of the super-sampling. Two vertical lines indicate the occurrence of an instantaneous frequency exceeding the predetermined threshold. In the first line 100, two neighboring maxima 102a and 102b are more than 32 samples separated. In this event, an enhancement pulse may be chosen for each of the two maxima, which is 32-time units long. For example, an enhancement pulse may be chosen, which is as long as to affect all super-sampled symbols of a trajectory. When the sample number between neighboring maxima decreases, enhancement pulses with decreasing length may be chosen. If, for example, the distance between two neighboring maxima decreases below 20 samples (as illustrated in row 104), enhancement pulses with a length of 16 samples may be chosen. If, however, the difference between the two neighboring maxima is somewhat greater, a first enhancement pulse 106a having a length of 16 samples and a second enhancement pulse 106b having a length of 24 samples may be applied. According to some embodiments of the present invention, enhancement pulses are chosen such that the enhancement pulses have a maximum possible length in order to account for the restrictions to the spectrum of the modulated signal, which is often defined for mobile telecommunication standards.

Although FIG. 10 gives a particular example for two subsequent enhancement pulses that do not overlap each other in time, it goes without saying that two or more subsequent enhancement pulses may also be applied such that the pulses overlap. To this end, for example, two or more adders may be applied to each of the signal components Q, I or R, φ, respectively. While applying enhancement pulses to each of the adders of one signal component, subsequent enhancement pulses may be applied such as to overlap in time. Alternatively, the subsequent enhancement pulses may be combined or added separately to form a combined enhancement pulse, before being applied to the signal components using a single adder.

Figure 11:
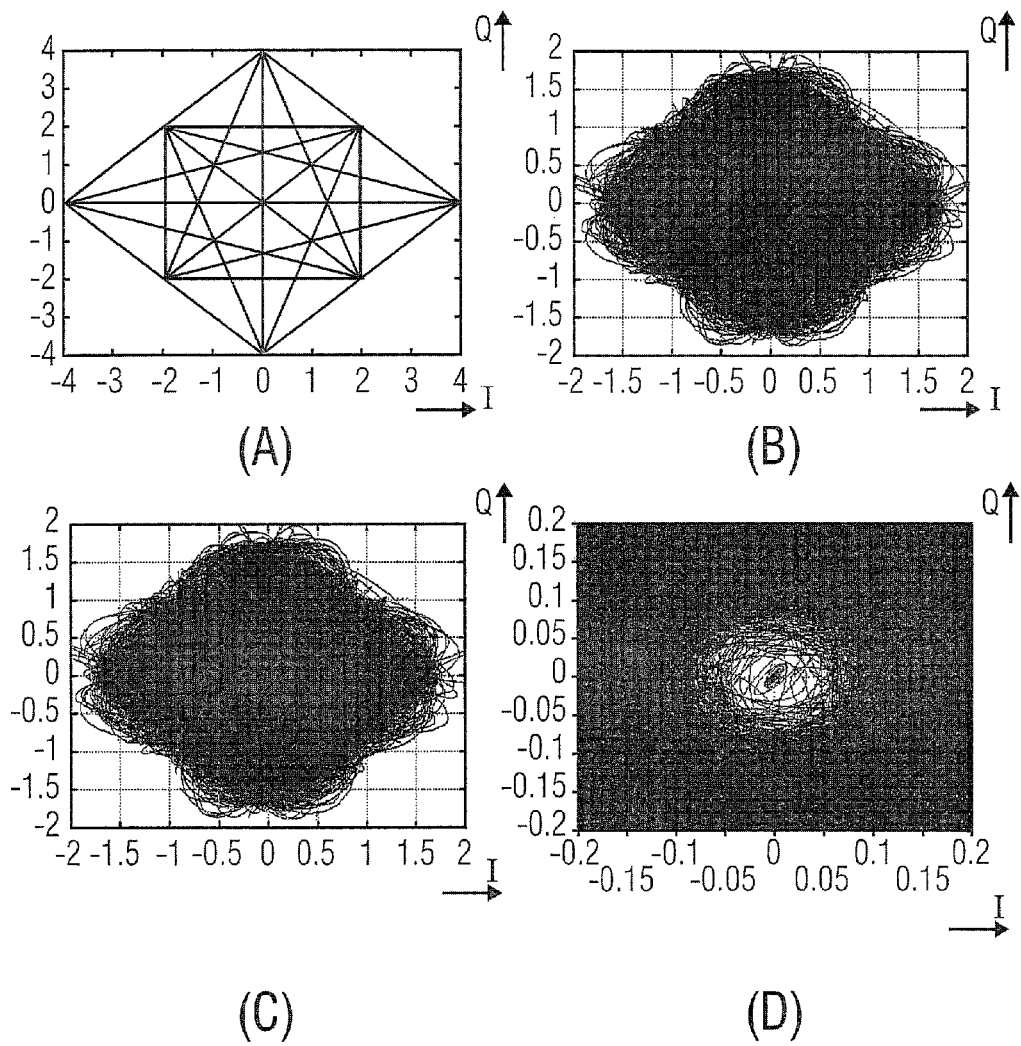
FIG. 11, consisting of FIGS. 11a-11d, shows examples of different representations of complex-valued signals with modified characteristics.

FIG. 11, which includes FIGS. 11a-11d, shows an exemplarily result from the application of an embodiment of the present invention to a UMTS signal. In particular, images of FIGS. 11a and 11b show a constellation diagram as it may occur in a UMTS environment. FIG. 11a shows a constellation diagram, which can be retrieved by adding several constellation points and which consists of nine chips [−4, 0], [−2, −2], [−2, 2], [0, −4], [0, 0], [0, 4], [2, −2], [2,2], [4,0]. As usual, the X-axis of the diagrams shows the in-phase component and the Y-axis shows the quadrature component. The chip in the origin is particularly critical, since the instantaneous frequencies, i.e., the angles between neighboring super-sampled symbols along a trajectory are particularly high. The maximum instantaneous frequency is +/−half of the sampling frequency of the interpolated signal, which is shown on the right-hand side.

FIGS. 11c and 11d show the same signal when an embodiment of the present invention is applied and when the maximum instantaneous frequency is set to be ⅙ of the sampling frequency of the interpolated signal. FIG. 11d shows a magnification of the area around the origin of the coordinate system. Please note that signals at the center ([0,0]) are valid signals. As it becomes apparent, the trajectories are shifted by a minimum amount from the origin of the coordinate system, thus, restricting the maximum instantaneous frequency without introducing too much energy into the signal.

Figure 12:
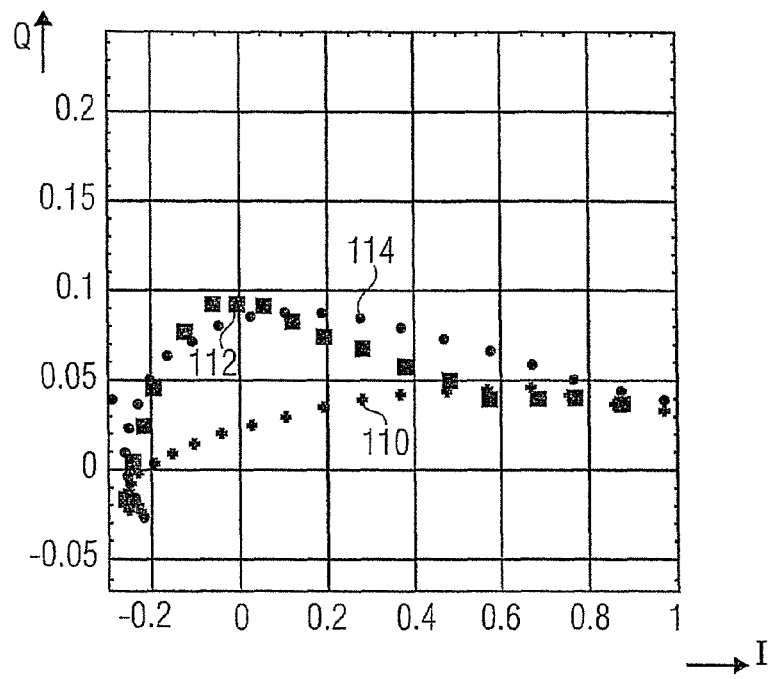
FIG. 12, consisting of FIGS. 12a and 12b, shows examples of complex-valued signals modified by an embodiment of the present invention.
Figure 12:
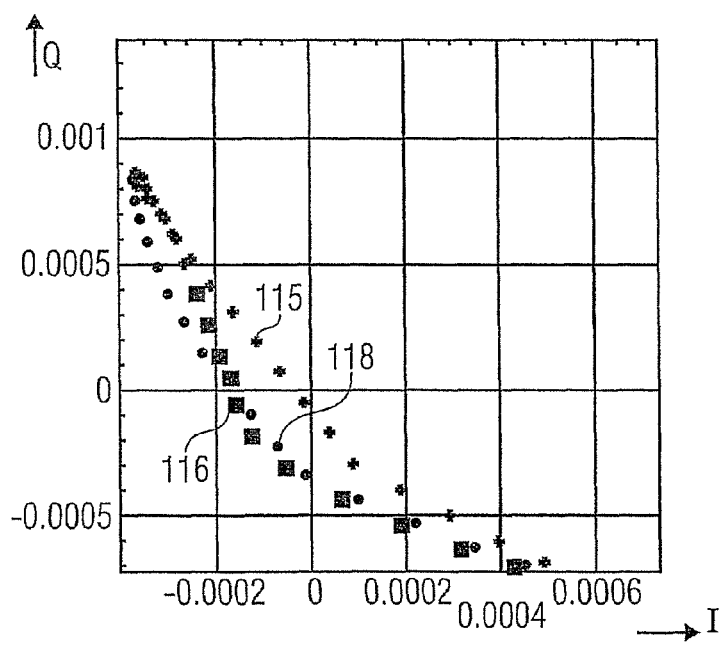

FIG. 12, which includes FIGS. 12a and 12b, shows two further results of the application of an embodiment of the present invention to an xxQAM signal.

FIGS. 12a and 12b each show a constellation diagram. However, the scales of both diagrams differ to a great extent. FIG. 12a shows the result of an application of an embodiment of the present invention to a greater signal that is to a signal having relatively high magnitude when passing the origin. Such great signals are, for example, obtained for the outer symbols in the constellation diagram of an xxQAM signal or at maximum RF output levels where the DAC is operated with maximum power. FIG. 12b shows the application to smaller signals, which are, for example, retrieved while transiting from inner symbols of the constellation diagram of an xxQAM signal or for small RF output power where the DAC may be operated with −60 DB. FIG. 12a shows the original signal, i.e., the complex-valued signal 110 to be modified in dark crosses. A first alternative embodiment combines first complex-valued enhancement pulses with the complex-valued signal 110 such that a first corrected complex-valued signal 112 is provided, which is indicated by dark rectangles.

A second modified complex-valued signal 114 is derived by a further embodiment of the present invention. The same embodiments provide the modified signals 116 and 118 when combining a complex-valued enhancement pulse with the complex-valued signal 115 of FIG. 12b. As it becomes apparent from both figures, complex-valued signals with high magnitude are shifted more (see FIG. 12a) than signals with low magnitude (see FIG. 12b). The modified complex-valued signals 112 and 116 illustrate an embodiment of the invention where the pulse width or the duration of the enhancement pulses is chosen depending on the distance between two neighboring maxima of the instantaneous frequency. As it becomes apparent from FIGS. 12a and 12b, the trajectory is shifted in a smaller area than in the case of the modified signals 114 and 118, which provides better results with respect to the in-band noise.

Figure 13:
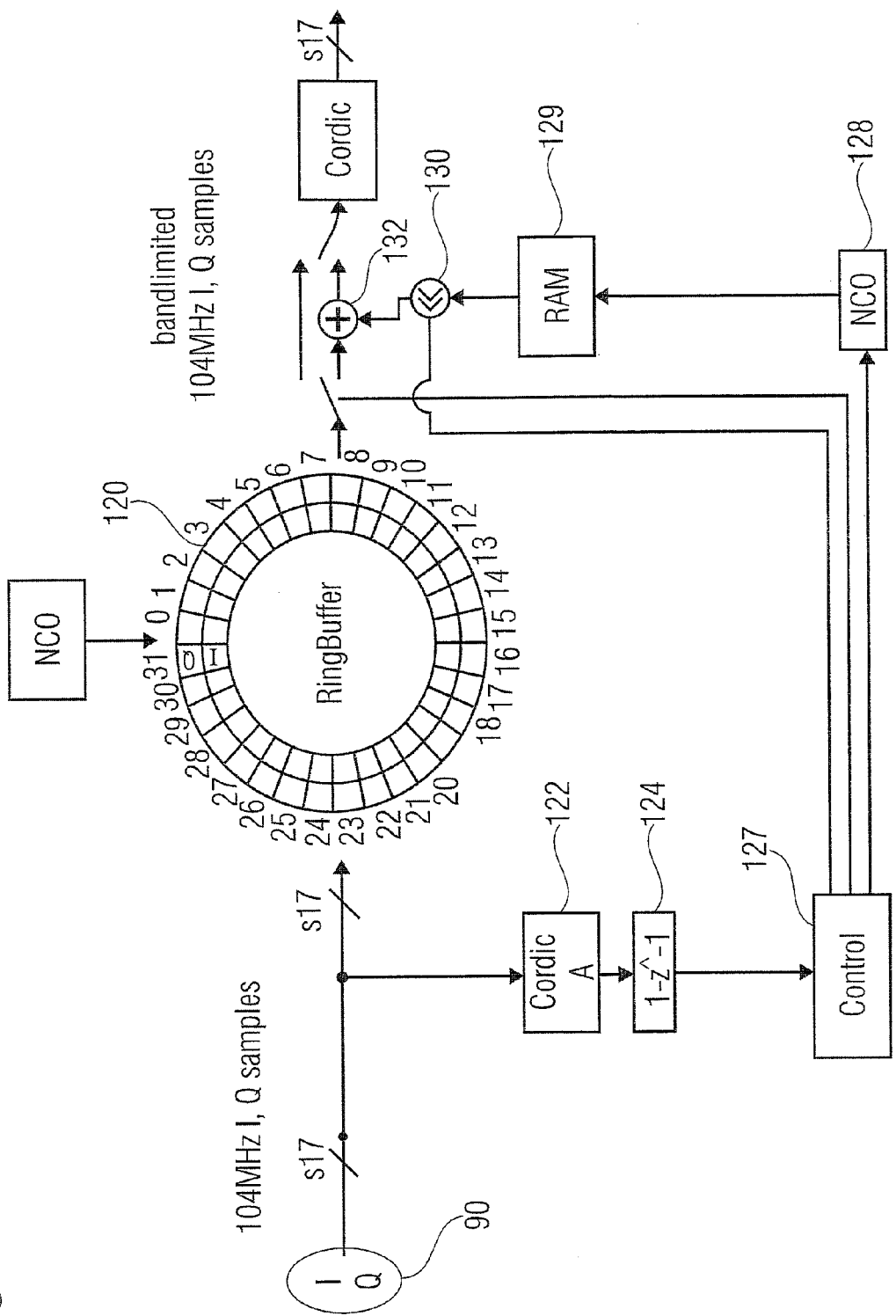
FIG. 13 shows an embodiment of an apparatus for modifying the characteristic of a representation of a complex-valued signal.

FIG. 13 shows a further embodiment of the present invention, which shows a practical implementation of, for example, the apparatus of FIG. 9. The representation of the complex-valued signal 90 is input into the apparatus. A ring buffer 120 serves as a delay unit, equivalent to the delay unit 82 of FIG. 9. For the sake of simplicity, the pulse shaping is not shown in FIG. 13. The representations of the complex-valued symbols 90 are provided with a symbol rate of, for example, 104 MHz. At the super-sampling rate, a first CORDIC 122 (COordinate Rotation DIgital Computer) may be utilized to derive the angles corresponding to each super-sampled complex-valued symbol. The relative phase angle between subsequent super-sampled symbols is calculated by an analyzer 124, which may alternatively also estimate the instantaneous frequency. When the relative phase angle or the instantaneous frequency exceed the desired maximum, the application of an enhancement pulse is required. If this is the case, a control system 127 may steer a RAM 129 and a multiplier 130 (shift register) via an NCO 128 such as to apply a predetermined enhancement pulse stored in the RAM 129 to the super-sampled symbols of the trajectory stored in the ring buffer 124. For example, the application may be performed by a shift register 130 and an adder 132 as indicated in FIG. 13. Thus, a sequence of super-sampled symbols can be provided where each of the super-sampled symbols has a relative phase angle with respect to its neighbor, which does not exceed a predetermined threshold.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example, via the Internet.

A further embodiment comprises a processing means, for example, a computer, or a programmable logic device, configured to or adapted to perform one of the methods described herein.

A further embodiment comprises a computer having installed thereon the computer program for performing one of the methods described herein.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A method for modifying a characteristic of a representation of a complex-valued signal, the signal comprising at least a representation of a first and a second complex-valued symbol, the method comprising:
    deriving a relative phase angle between the representation of the first and the second complex-valued symbols;
    combining a representation of a complex-valued enhancement pulse and the representation of the complex-valued signal to obtain a representation of a first and a second corrected complex-valued symbol, wherein the enhancement pulse is chosen such that the relative phase angle between the first and second corrected symbols is smaller than a predetermined threshold; and
    wherein the combining comprises adding another enhancement pulse to a representation of a phase of the complex-valued signal; or
    adding a further enhancement pulse to a representation of a magnitude of the complex-valued signal.

2. A method for modifying a characteristic of a representation of a complex-valued signal, the signal comprising at least a representation of a first and a second complex-valued symbol, the method comprising:
    deriving a relative phase angle between the representation of the first and the second complex-valued symbols;
    combining a representation of a complex-valued enhancement pulse and the representation of the complex-valued signal to obtain a representation of a first and a second corrected complex-valued symbol, wherein the enhancement pulse is chosen such that the relative phase angle between the first and second corrected symbols is smaller than a predetermined threshold; and
    wherein the representation of the complex-valued enhancement pulse is chosen such that a magnitude of the enhancement pulse is greater for a first pair of first and second complex-valued symbols with a greater magnitude than for a second pair of first and second complex-valued symbols having a lower magnitude.

3. The method according to claim 2, wherein the combining comprises adding a first enhancement pulse to a representation of a real part of the complex-valued signal; or adding a second enhancement pulse to a representation of an imaginary part of the complex-valued signal.

4. A method for modifying a characteristic of a representation of a complex-valued signal, the signal comprising at least a representation of a first and a second complex-valued symbol, the method comprising:
    deriving a relative phase angle between the representation of the first and the second complex-valued symbols;
    combining a representation of a complex-valued enhancement pulse and the representation of the complex-valued signal to obtain a representation of a first and a second corrected complex-valued symbol, wherein the enhancement pulse is chosen such that the relative phase angle between the first and second corrected symbols is smaller than a predetermined threshold; and
    wherein the representation of the complex-valued signal comprises a sequence of representations of complex-valued symbols, comprising:
        deriving a relative phase angle between each pair of neighboring complex-valued symbols within the sequence; and
        combining a complex-valued enhancement pulse with the representation of the complex-valued signal for every pair of neighboring symbols having a relative phase angle exceeding the predetermined threshold; and
    wherein the representation of the complex-valued enhancement pulse is chosen such that the length of the enhancement pulse depends on the number of symbols occurring between two consecutive pairs of neighboring symbols exceeding the threshold.

5. The method according to claim 4, wherein the enhancement pulse is shorter for a smaller number of symbols occurring between the two consecutive pairs of symbols than for a higher number of symbols occurring between the two consecutive pairs of symbols.

6. An apparatus for modifying the characteristic of a representation of a complex-valued signal, the signal comprising at least a representation of a first and a second complex-valued symbol, the apparatus comprising:
    an analyzer adapted to derive a relative phase angle between the representation of the first and the second complex-valued symbols;
    a signal enhancer adapted to combine a representation of a complex-valued enhancement pulse and the representation of the complex-valued signal to obtain a representation of a first and a second corrected complex-valued symbol, wherein the enhancement pulse is chosen such that a relative phase angle between the first and second corrected symbols is smaller than a predetermined threshold; and wherein the signal enhancer is adapted to add another enhancement pulse to a representation of a phase of the complex-valued signal; or to add a further enhancement pulse to a representation of a magnitude of the complex-valued signal.

7. An apparatus for modifying the characteristic of a representation of a complex-valued signal, the signal comprising at least a representation of a first and a second complex-valued symbol, the apparatus comprising:

an analyzer adapted to derive a relative phase angle between the representation of the first and the second complex-valued symbols;

a signal enhancer adapted to combine a representation of a complex-valued enhancement pulse and the representation of the complex-valued signal to obtain a representation of a first and a second corrected complex-valued symbol, wherein the enhancement pulse is chosen such that a relative phase angle between the first and second corrected symbols is smaller than a predetermined threshold; and wherein the signal enhancer is adapted to choose the enhancement pulse such that the magnitude of the enhancement pulse is greater for a first pair of first and second complex-valued symbols with a greater magnitude than for a second pair of first and second complex-valued symbols having a lower magnitude.

8. An apparatus for modifying the characteristic of a representation of a complex-valued signal, the signal comprising at least a representation of a first and a second complex-valued symbol, the apparatus comprising:

an analyzer adapted to derive a relative phase angle between the representation of the first and the second complex-valued symbols;

a signal enhancer adapted to combine a representation of a complex-valued enhancement pulse and the representation of the complex-valued signal to obtain a representation of a first and a second corrected complex-valued symbol, wherein the enhancement pulse is chosen such that a relative phase angle between the first and second corrected symbols is smaller than a predetermined threshold; and wherein the signal enhancer is adapted to choose the enhancement pulse such that the length of the enhancement pulse depends on the number of symbols occurring between two consecutive pairs of neighboring symbols exceeding the threshold.

9. The apparatus according to claim 8, wherein the signal enhancer is adapted to choose the enhancement pulse such that the enhancement pulse is shorter for a smaller number of symbols occurring between the two consecutive pairs of symbols than for a higher number of symbols occurring between the two consecutive pairs of symbols.

\* \* \* \* \*